Aug. 22, 1944.   B. C. HINELINE ET AL   2,356,668
PHOTOGRAPHIC FILTER HOLDER
Filed May 1, 1944
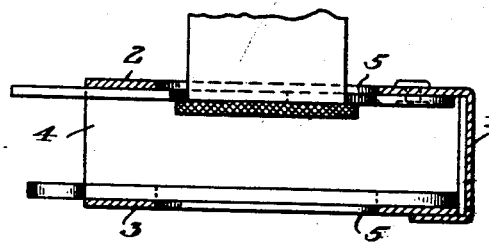
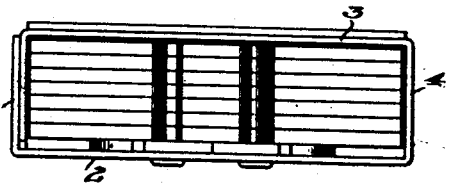
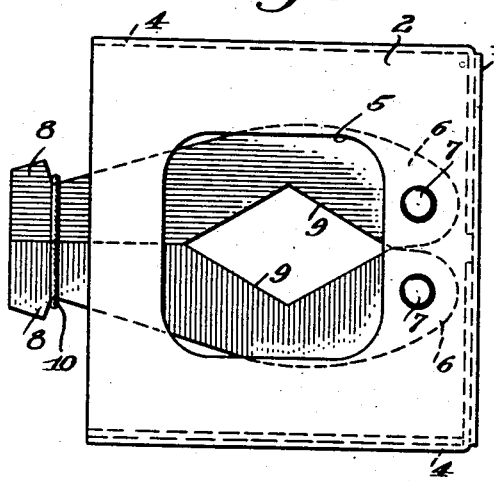
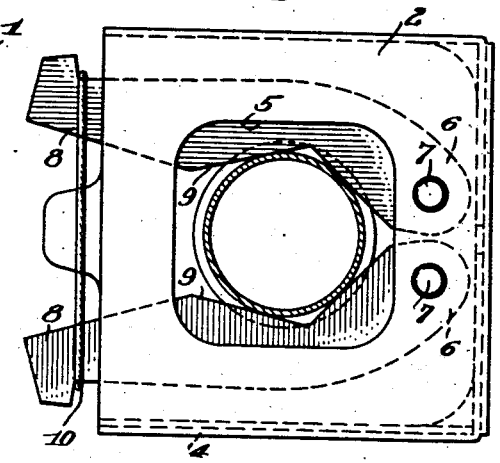
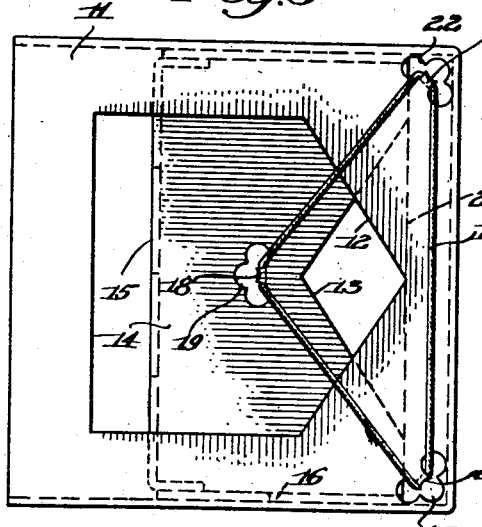
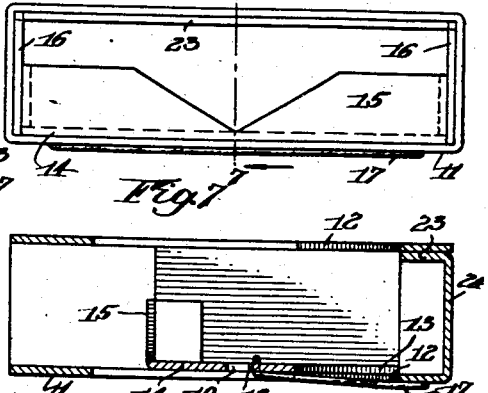
INVENTORS
Burton C. Hineline
Fred Knoepke
BY Harold E. Stonebraker
their Attorney Patented Aug. 22, 1944

2,356,668

UNITED STATES PATENT OFFICE 2,356,668

PHOTOGRAPHIC FILTER HOLDER

Burton C. Hineline, Rochester, and Fred Knoepke, New York, N. Y., assignors to Defender Photo Supply Co., Inc., Rochester, N. Y., a corporation of New York Application May 1, 1944, Serial No. 533,484

7 Claims. (Cl. 95—81.5)

This invention relates to a photographic filter holder, and has for its object to afford a simple and inexpensive device that can be quickly attached to the lens tube of a photographic enlarger or other camera and which serves to hold a selected color filter in front of the camera lens.

In making enlarged prints from miniature negatives, it is common practice to obtain any one of several effects on variable contrast paper by the use of one of a group of differently colored filters which are furnished to the customer in convenient containers or receptacles, and it is a further object of the invention to provide a receptacle in which the several filters can be packaged for distribution and sale, and which permits using the same receptacle for attachment to a lens tube and for holding the selected filter in operative position, while the filters not in use are of course removed from the receptacle.

In a more specific aspect, the invention has for its purpose to afford a cardboard receptacle or holder provided with gripping means held against and movable over the inner surface of one of the walls of the receptacle and operable to grip a lens tube and retain the receptacle thereon while the selected filter is supported on the opposite wall of the receptacle in front of the camera lens.

Still another purpose of the invention is to provide simple gripping means which can be formed of cardboard and is movably attached to the wall of a cardboard receptacle in such a manner as to engage a lens tube with sufficient friction to maintain the receptacle in operative position and permit the ready insertion or removal of a filter.

To these and other ends, the invention consists in the construction and arrangement of parts that will appear clearly from the following description when read in conjunction with the accompanying drawing, the novel features being pointed out in the claims following the specification.

In the drawing:

Fig. 1 is a vertical sectional view taken centrally of a filter holder constructed in accordance with one embodiment of the invention, and showing it in operative position on the lens tube of a conventional photographic enlarger;

Fig. 2 is a plan view of the filter holder removed from the lens tube, with the gripping members in their innermost positions;

Fig. 3 is a view similar to Fig. 2, with the gripping members separated and engaging the lens tube, the latter appearing in section;

Fig. 4 is an end elevation of the receptacle, with a series of filters packed therein;

Fig. 5 is a plan view of a modified arrangement;

Fig. 6 is a view in end elevation of the same, looking toward the open end of the receptacle, and Fig. 7 is a sectional view on the line 7—7 of Fig. 6.

Referring more particularly to the drawing in which like reference numerals refer to the same parts throughout the several views, and to the arrangement appearing in Figs. 1 to 4 inclusive, the invention is shown in conjunction with a receptacle which may be constructed of heavy cardboard or other suitable inexpensive material that is sufficiently rigid and strong for the purpose. The receptacle is open at one end to permit insertion and removal of the filters, and has the closed end 1, while 2 and 3 designate opposite top and bottom walls respectively, referring to Fig. 1, the side walls being designated at 4. The receptacle is of a width between the side walls 4, to accommodate the conventional cardboard or other mounting on which the colored filter element is supported, and the opposite top and bottom walls 2 and 3 are spaced apart sufficiently to provide capacity for a multiplicity of filters, as shown in Fig. 4, so that they may be packaged in the receptacle for distribution and sale. When used by a customer, all of the filters are removed except the one selected for a particular operation, the receptacle being secured to the lens tube and functioning in the manner that will now be described.

The opposite top and bottom walls 2 and 3 are provided with central openings indicated at 5 which are preferably square and approximately the same size as the filter element so that the filter element is alined with the opening 5 in the outer wall 3 when the receptacle is in operative position, as shown in Fig. 1.

In order to maintain the receptacle on the lens tube, the top wall 2 is provided on its inner surface with gripping means movable to permit positioning the receptacle over the lens tube and to engage the latter, and this is preferably accomplished by a pair of symmetrical gripping members which are movable over the inner surface of the top wall 2. Each of these gripping members is preferably of heavy cardboard and includes an inner end portion 6 pivotally attached to the wall 2 at a point adjacent the end wall 1 by means of a suitable rivet 7 which permits movement of the gripping member over the wall 2 while holding it frictionally in any adjusted position.

Each gripping member extends outwardly beyond the open end of the receptacle to afford an operating or finger portion 8, while 9 designates a V-shaped gripping edge or portion at the center of the gripping member arranged to engage the periphery of the lens tube, as shown in Fig. 1. 10 is an elastic extending around fingers 8 for exerting tension thereon.

In operation, the gripping members are moved outwardly away from each other by engaging the finger portions 8, to permit slipping the upper wall 2 of the receptacle over the lower end of the lens tube after which the gripping members are moved together until they engage opposite portions of the outer periphery of the lens tube. The gripping members are held against the inner surface of the top wall 2 with sufficient friction to retain them in adjusted position and to hold the receptacle on the lens tube, either resting upon the flange at the bottom end of the latter or by frictional engagement with the outer periphery of the lens tube.

When the receptacle is in this position, any selected filter may be inserted through the open end under the lens tube until it engages the closed end 1 and when in such position, the filter rests upon the bottom wall 3, equally spaced from the side walls 4 and is in proper position for cooperation with the lens, although it will be understood that the device may be used in conjunction with any lens tube or camera wherever it is desirable to employ a color filter and to support the same temporarily on a lens tube.

In Figs. 5 to 7 inclusive, there is shown a modified form of gripping means in which a slidable member is employed instead of a pair of pivoted gripping members, the slidable member being actuated inwardly of the receptacle and cooperating with a gripping edge portion at one side of the opening in the receptacle to engage the lens tube.

In this arrangement, 11 designates the top wall of the receptacle which is constructed similarly to the form shown in Figs. 1 to 4, except that the opening in the top wall through which the lens tube enters is provided with a preferably V-shaped gripping edge 12 to engage one side of the lens tube while the opposite side of the lens tube is engaged by a similar V-shaped gripping edge 13 of a slidable gripping member that is mounted for movement within the receptacle.

The slidable gripping member includes a body portion or wall 14 that is located in juxtaposition to the top wall 11 of the receptacle, being cut away at 13 to afford the cooperating gripping edge, and provided at its outer edge with a downwardly turned flange 15 affording an operating or finger-engaging portion. 16 designate downwardly turned flanges at the side edges of the slidable gripping member extending between the top and bottom walls of the receptacle and serving to guide the gripping member in its movement within the receptacle. To hold it in gripping relation to the lens tube, there is provided an elastic 17 engaging an ear or lug 18 formed centrally on the body portion 14 of the gripping member by cutting out the opening 19, and a pair of ears or lugs 21 similarly formed at the outer corners of the top wall 1 by cutting out the openings 22. With this arrangement, the elastic 17 holds the slidable gripping member in the position illustrated in Fig. 5, and to position the receptacle in operative relation, the finger piece 15 is engaged to pull the slidable gripping member 14 outwardly against the tension of the elastic 17 until the opening between the gripping member and the gripping edge 12 of the top wall is sufficient to receive the end of the lens tube. After positioning the device over the lens tube, the gripping member is released and engages the lens tube under the tension of the elastic 17, and this functions to hold the receptacle in operative position on the lens tube to receive a filter which is positioned within the receptacle in the same manner as already described with reference to the structure shown in Figs. 1 to 4 inclusive.

Inward movement of the slidable gripping member may be limited by any convenient stop portion as by the flange 23 formed on the end wall 24 of the receptacle, and it will be understood that with the structure shown in Figs. 5 to 7, the receptacle can be packed with filters by first removing the elastic 17 and the slidable gripping member to permit inserting the filters, after which the gripping member can be inserted for packaging and shipping. When the device is to be used for supporting a filter on a lens tube, the filters are removed, the slidable gripping member inserted into the receptacle, and the elastic 17 engaged with the lugs as already described. The device is then ready for use by attaching it to a lens tube in the manner described, inserting a filter through the open end of the receptacle, and permitting it to rest on the bottom wall of the receptacle under the finger portion 15.

While the invention has been described in connection with the particular embodiment herein disclosed, it is not confined to the precise details set forth, and this application is intended to cover such modifications or changes as may come within the intent of the improvement and the scope of the following claims.

We claim:

1. A photographic filter holder comprising a cardboard receptacle open at one end and closed at the other end, said receptacle including opposite walls having alined openings therein of a size approximating that of a filter, said opposite walls being spaced from each other sufficiently to accommodate a series of filters therebetween for packaging, and gripping means held against the inner surface of one of said opposite walls and movable in relation thereto to engage a lens tube and retain the receptacle thereon.

2. A photographic filter holder comprising a cardboard receptacle open at one end and closed at the other end, said receptacle including opposite walls having alined openings therein of a size approximating that of a filter, said opposite walls being spaced from each other sufficiently to accommodate a series of filters therebetween for packaging, and a pair of symmetrical gripping members pivotally attached to the inner surface of one of said opposite walls and movable over the opening in said wall toward each other to engage a lens tube and retain the receptacle thereon.

3. A photographic filter holder comprising a cardboard receptacle open at one end and closed at the other end, said receptacle including opposite walls having alined openings therein of a size approximating that of a filter, said opposite walls being spaced from each other sufficiently to accommodate a series of filters therebetween for packaging, a pair of symmetrical gripping members movable over the inner surface of one of said opposite walls, each of said gripping members including an inner end portion pivoted to the last mentioned wall adjacent to the closed end of the receptacle, an operating portion extending outwardly beyond the open end of the receptacle, and a jaw portion overlying the opening in said wall and operable to engage a lens tube, said gripping members being held frictionally in engagement with the lens tube and functioning to retain the receptacle thereon.

4. A photographic filter holder comprising a cardboard receptacle open at one end and closed at the other end, said receptacle including opposite walls having alined openings therein of a size approximating that of a filter, said opposite walls being spaced from each other sufficiently to accommodate a series of filters therebetween for packaging, a pair of symmetrical gripping members movable over the inner surface of one of said opposite walls, each of said gripping members comprising a cardboard element including an inner end portion pivoted to the last mentioned wall adjacent to the closed end of the receptacle by rivet means that holds the gripping member frictionally in adjusted position, said gripping member including an operating portion extending outwardly beyond the open end of the receptacle, and a jaw portion overlying the opening in said wall and operable to engage a lens tube, said gripping members being positionable and frictionally held to retain the receptacle on the lens tube.

5. A photographic filter holder comprising a cardboard receptacle open at one end and closed at the other end, said receptacle including opposite walls having alined openings therein of a size approximating that of a filter, said opposite walls being spaced from each other sufficiently to accommodate a series of filters therebetween for packaging, a gripping member slidably mounted against the inner surface of one of said opposite walls, said wall having a gripping edge, the gripping member being positionable to engage a lens tube positioned between the gripping member and said gripping edge of said wall, and means connecting the gripping member and wall acting to move the gripping member toward the wall and retain the receptacle on the lens tube.

6. A photographic filter holder comprising a cardboard receptacle open at one end and closed at the other end, said receptacle including opposite walls having alined openings therein of a size approximating that of a filter, said opposite walls being spaced from each other sufficiently to accommodate a series of filters therebetween for packaging, a gripping member comprising a slide movable over the inner surface of one of said opposite walls, said wall having a gripping edge, right-angular guiding portions at the side edges of said slide extending between said opposite walls of the receptacle, a finger-engaging operating portion at the outer edge of the slide, a jaw portion at the inner edge of the slide engageable with a lens tube, and an elastic member connecting said wall and slide and acting to move the slide inwardly of the receptacle and to retain the receptacle on the lens tube.

7. A photographic filter holder comprising a cardboard receptacle open at one end and closed at the other end, said receptacle including opposite walls having alined openings therein of a size approximately that of a filter, said opposite walls being spaced from each other sufficiently to accommodate a series of filters therebetween for packaging, a gripping member comprising a slide movable over the inner surface of one of said opposite walls, said wall having a gripping edge, a jaw portion at the inner edge of the slide engageable with a lens tube, and an elastic member connected to said wall at its inner corners and to said slide at its central portion and acting to move the slide inwardly of the receptacle and to retain the receptacle on the lens tube.

BURTON C. HINELINE.
FRED KNOEPKE.